Aug. 30, 1966

K. G. ANDERSON 3,269,081

WRAPPING METHODS AND APPARATUS

Filed Aug. 28, 1963

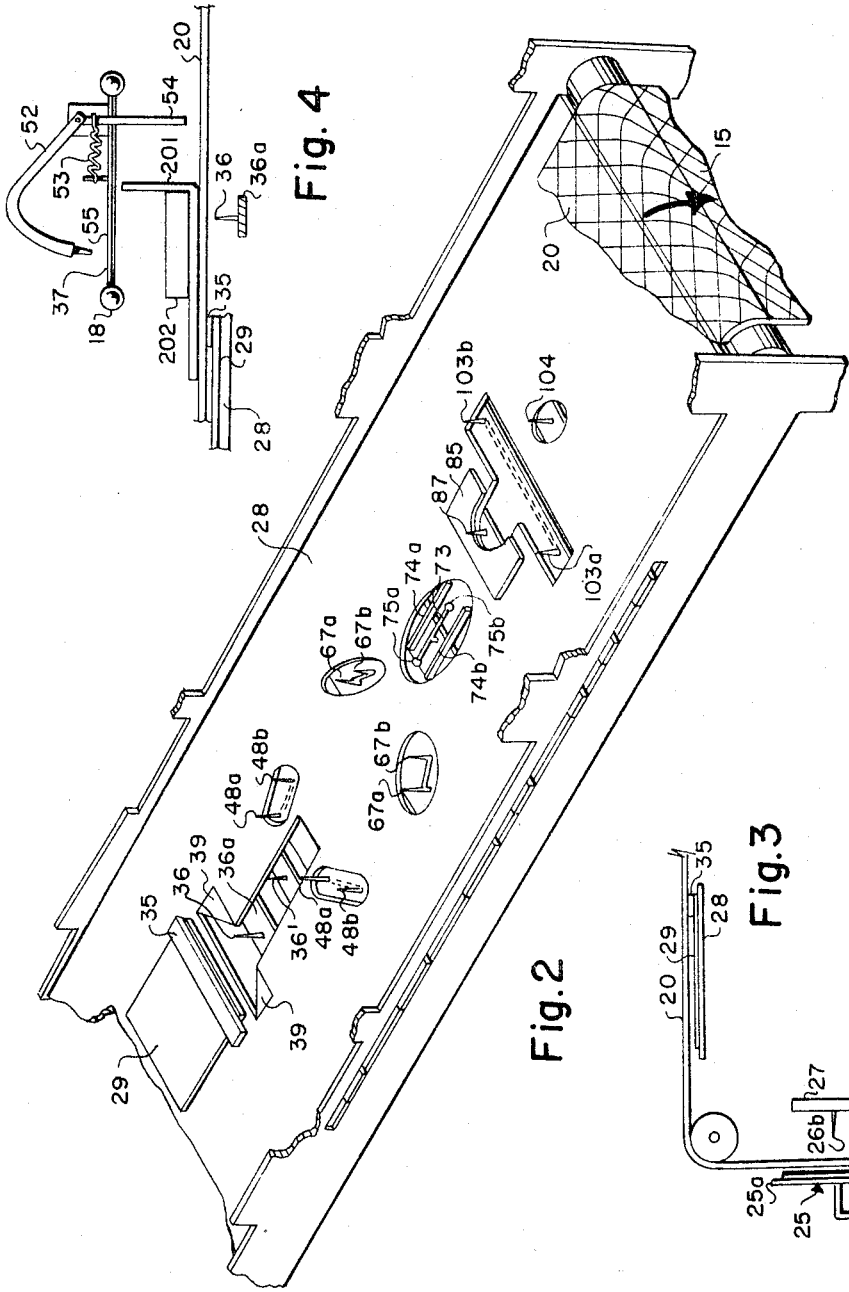

Aug. 30, 1966   K. G. ANDERSON   3,269,081
WRAPPING METHODS AND APPARATUS
Filed Aug. 28, 1963   5 Sheets-Sheet 3

United States Patent Office 3,269,081
Patented August 30, 1966

3,269,081
WRAPPING METHODS AND APPARATUS
Kelvin G. Anderson, Greer, S.C., assignor to W. R. Grace & Co., Duncan, S.C., a corporation of Connecticut
Filed Aug. 28, 1963, Ser. No. 305,109
12 Claims. (Cl. 53—31)

This invention relates to methods and apparatus for wrapping objects in organic thermoplastic films and particularly in thin, limp, flexible organic thermoplastic films.

A virtually infinite variety of wrapping machines are known to the art. For the most part, these have been designed for use with paper or with films of regenerated cellulose and cellulosic derivatives, e.g., cellophane. While these machines are generally satisfactory for the purpose for which they were designed serious problems occur in attempting to adapt them for use with the newer organic thermoplastic films such as thin, limp, flexible films of polypropylene, polyethylene, polyethylene terephthalate, polyvinylchloride, polystyrene and the like. A satisfactory solution to the problem of holding these thin films firmly in position while they are being transported through the various wrapping stations has not yet been suggested. Consequently frequent wrinkling and bunching occurs, resulting in a high number of rewraps or in costly shut-downs. The tendency for build up of static electricity charges in many of the thermoplastic films often causes the films to adhere to various metallic portions of the machine, again resulting in wrinkling and bunching.

The existing machines have, in addition, a number of inherent weaknesses that are apparent regardless of the type of wrapping material used. One of the most important of these weaknesses is lack of flexibility. Generally the product and wrapping material are transported through a series of wrapping zones in each of which one or more folding operations take place. The folds are made by a series of mechanical fingers, tuckers or plows one or more of which are actuated by cams or levers. A change from one size product to another requires expensive, time-consuming adjustment and synchronization of the machine. If an off-size product is fed into the machine jamming frequently occurs, requiring production shut down and readjustment. Jamming can also place a serious strain on various of the mechanical parts and/or upset the critical timing sequence between the various stations.

Another inherent weakness of currently known machines results from the mechanical complexity thereof. This necessitates virtually constant maintenance if trouble-free performance is to be obtained. Further, the complex gear and lever arrangement places a definite upper limit on the speed of the machines. The highest known production rate, in machines continuously packaging a very uniform, relatively small product e.g., cigarettes, is about 150 to 200 packages per minute. With larger, less uniform objects production rates seldom exceed 50 to 75 packages per minute. And these rates are obtained only through use of the most highly sophisticated mechanical design so that it is most unlikely that any further significant improvement in production rate or efficiency can be expected.

It is also of some importance to note that the vast majority of existing machines are designed to make a so-called "drugstore" type of wrap. Typical examples of the "drugstore" wrap are the wraps of the three (foil, paper and cellophane) wraps in a cigarette package. This wrap, although giving a clean, neat final appearance, requires relatively large sheets of wrapping material. Significant savings can be made by using a "diaper wrap" which can be made with smaller size sheets. But, because of the difficulty of mechanically manipulating the large unsupported corners of the wrapping material, this latter type of wrap has not been widely used in automatic operations.

A general object of the present invention is to provide entirely new and radically different wrapping methods and means which obviate many or all of the above prior art problems. Another object is to provide novel packages wrapped in thin, limp, flexible organic thermoplastic films. One specific object of the invention is to provide methods and means for folding a limp, flexible organic thermoplastic film about an object resting thereon. Another specific object of the invention is to provide means for automatically wrapping objects in thin, limp flexible organic thermoplastic films which means include only a few simple mechanical elements (if any). Still another specific object of the invention is to provide means and methods for automatically wrapping an object in thin, limp, flexible organic thermoplastic films using the "diaper wrap" technique. Another object of the present invention is to provide means and methods for automatically wrapping objects in thin, limp flexible organic thermoplastic films at production rates which can, if desired, be at least several times faster than rates available on the most sophisticated types of existing machines. Still further objects and numerous advantages of the invention will become apparent to those skilled in the art during the course of the following detailed description, to be made in connection with the accompanying drawings, in which:

FIGURE 2 is a perspective view taken from about line 2—2 and showing in greater detail elements just below the conveyor belt 20 in FIGURE 1;

FIGURE 3 is a side elevation showing in greater detail elements adjacent the feed end (left end) of the machine in FIGURE 1;

FIGURE 4 is an elevation showing in greater detail certain elements in the circle IV in FIGURE 1;

Figure 1:
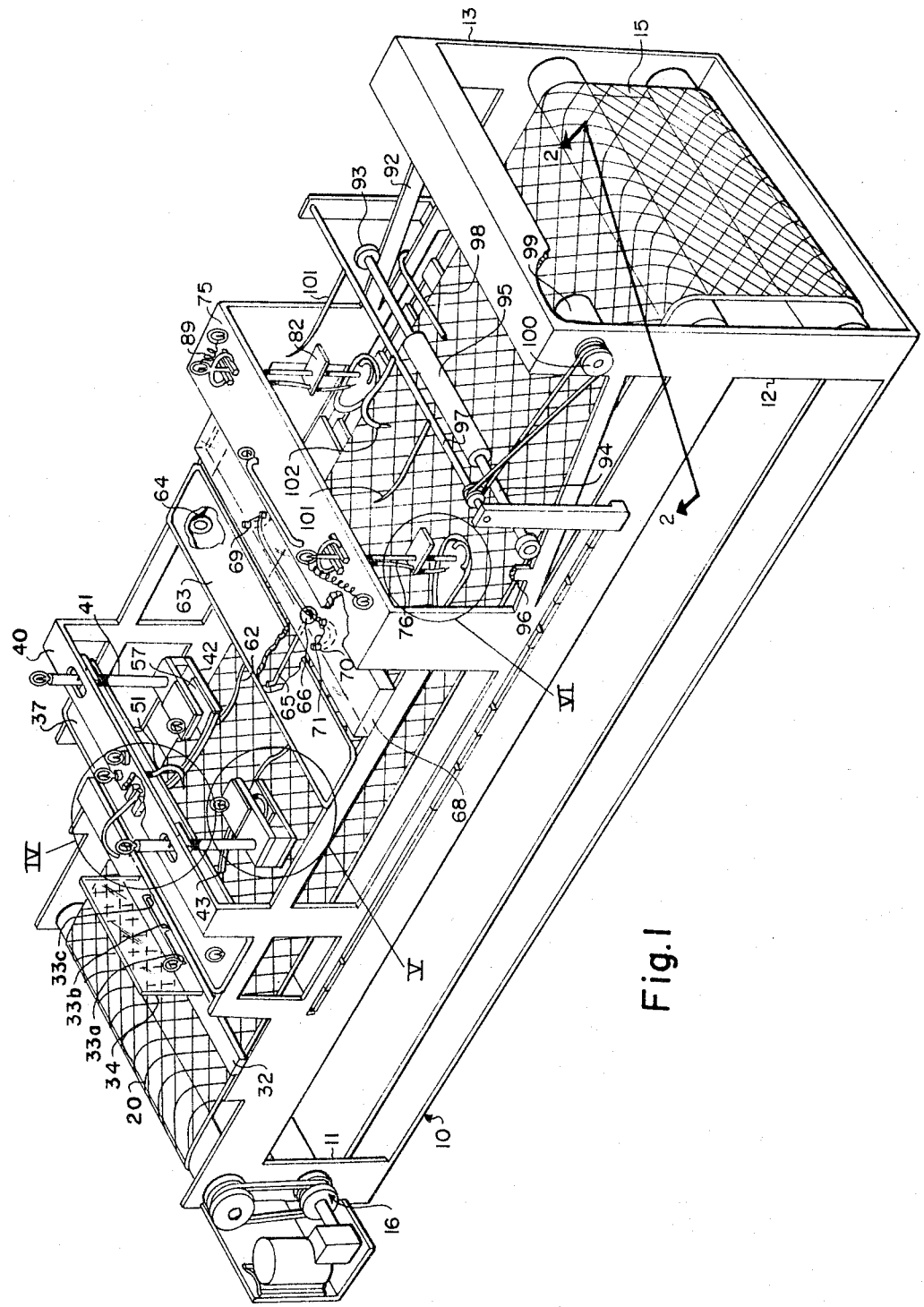
FIGURE 1 is a perspective view, taken from the delivery end, of an automatic "diaper wrap" type wrapping machine which utilizes the principles of the invention.
Figure 5:
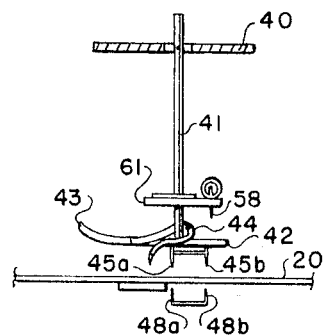
FIGURE 5 is an elevation showing in greater detail certain elements in the circle V in FIGURE 1.
Figure 6:
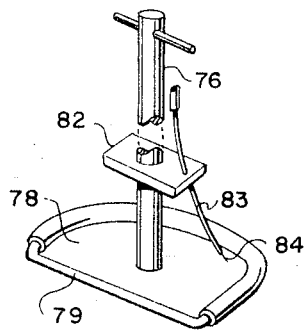
FIGURE 6 is an elevation showing in greater detail certain elements in the circle VI in FIGURE 1.

This invention is based upon the discovery that a sheet of thin, limp flexible organic thermoplastic film can be folded about an object resting on its upper surface by electrostatically charging an exposed area of the upper film surface and then subjecting the upper surface of the changed portion to an electrostatic force field of opposite polarity while at the same time subjecting the lower surface of the charged portion to an electrostatic force field of like polarity whereby the film is first lifted up and then forced down over the object resting thereon. The wrapping method of this invention applies this folding method, in sequence, to selected areas of the film sheet until all portions of the sheet have eventually been lifted up and then forced down over the object and/or over film layers previously folded about the object. Suitable apparatus for performing the folding method includes a first high voltage direct current (hereinafter referred to as D.C.) electrode for applying an electrostatic charge to at least a portion of the upper film surface, a second high-voltage D.C. electrode having a polarity opposite that of the first electrode, a third high voltage D.C. electrode having a polarity like that of the first electrode, said second and third electrodes being spaced from each other and arranged so that their respective electrostatic fields substantially simultaneously act upon charged film fed therebetween; and means for bringing the film portion charged by the first electrode into the gap between the second and third electrodes.

Preferably the last named means comprise a belt conveyor composed of non-conductive or dielectric material and having a high ratio of open to closed surface area, (e.g., a reticular conveyor) upon which the film sheet and product are supported for transport through the electrode assembly.

Specific aspects of the invention and the numerous possible modifications and/or variations of the same will be best understood by reference to the following detailed description of the device illustrated in FIGURES 1–6 of the drawings.

The illustrated embodiment discloses an apparatus for automatically making an overwrap of the "diaper-wrap" type. It is however to be fully understood that the invention is not to be limited to this particular type of wrap nor to the specific apparatus for obtaining the same that is shown in the drawings.

Referring to the drawings it is seen that the illustrated device includes a main frame 10, supporting legs 11, 12, 13, etc., a reticular conveyor belt 15 of non-conducting material, power means 16 to drive the belt, and a plurality of electrodes or electrode assemblies, some beneath and some above the upper run 20 of the conveyor and located in the line of travel of the conveyor upper run. The various electrodes and their respective function will be more fully described hereinbelow. Commercially available high voltage D.C. power sources (not shown) were used to energize the electrodes, where necessary.

The various structural elements of the frame may be fabricated from any suitable material. It is only necessary that there be no metal parts in the immediate vicinity of the electrodes which could distort or otherwise affect the electrostatic field of the electrodes. The electrode mounting elements, e.g., bar 32 are composed of an electrical insulating material such as glass or any of the electrically insulating plastics such as polyethylene, polystyrene, poly(vinylchloride), lucite (polymers of methacrylic acid esters) and the like. As above noted, the conveyor material must also be an electrically insulating material. Suitable materials include polyethylene, polypropylene, polytetrafluoroethylene (Teflon), polymonochlorotrifluorethylene (Kel-F, flurothene), fiberglass, rubber, etc. If an endless conveyor belt arrangement is used (as illustrated) then, of course, the conveyor material selected must be sufficiently flexible to meet the requirements for such arrangement. The conveyor must be designed to permit application of electrostatic force fields therethrough and to minimize direct contact with wrapping material resting thereupon. This can be done in several ways. The most satisfactory presently known mode is to construct the conveyor from a plastic mesh such as the commercially available polyethylene mesh sold under the tradename "Vexar." If desired the conveyor may comprise a plurality of spaced parallel strands or rods, e.g., small diameter circular plastic belting with spacing between belts at least twice the diameter of the belts.

The voltage and current requirements depend primarily upon the type of wrapping material, the speed of the conveyor, the area of wrapping material to be folded, the flexibility of the wrapping material and the spacing of the electrodes. Voltages between about 5 and about 50 kilovolts (hereinafter designated kv.) have been found satisfactory. Lower or higher voltages can be used where suitable. In order to minimize or preclude generation of ozone and/or power losses due to corona discharge it is not preferred to use the lowest possible voltage capable of performing the desired functions. This can be best accomplished by using two separate power supplies, one of positive and one of negative polarity, so that voltage measured to ground is always at a minimum. Further desirable measures include use of good wiring insulation and of rounded surfaces or rings around electrical connections to preclude corona discharge from any sharp points. High resistance resistors are connected in series with each electrode so that very low currents (very seldom more than one or two milliamperes) are drawn, making the apparatus virtually shock proof.

The entrance or feed end of the machine as it is viewed in FIGURE 1 is at the left hand end. The delivery end is at the right in FIGURE 1. In referring to positional relationships of various elements the term "forward" will imply toward the delivery end while "to the rear" implies towards the feed end.

Figure 7:
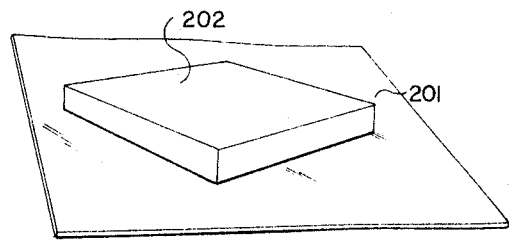
FIGURE 7 is a perspective view of an object to be wrapped and the organic thermoplastic film wrapping sheet used for making a diaper wrap around the object.

Operation is commenced by placing a sheet of wrapping material 201 on the conveyor at this point and then placing the product 202 to be wrapped on this sheet. As best seen in FIGURE 7, in order to obtain a "diaper" wrap, the sheet of wrapping material is skewed with respect to the line of travel of the conveyor, while the product is placed so that its sides are parallel to the line of travel. In the illustrated example, the product was a rectangular solid 5 inches by 5½ inches by 1 inch thick. The wrapping film used was 10½ inches square and one mil (.001 inch) thick. It had been produced from commercially available low density (0.92) polyethylene.

For best results, particularly when operating in a high humidity environment, it is preferred to preliminarily charge the conveyor material. For this reason a pair of electrodes 25 and 26 (FIGURE 3) are mounted on opposite sides of the vertical run of the conveyor at the feed end of the machine. Electrode 25 was a sheet of aluminum foil 25b supported by a Lucite supporting plate 25a of equal size. The plate was 10 inches high and extended across the width of the plastic mesh conveyor belt. It was spaced about one inch from the surface of the belt. Electrode 26 was comprised of three separate pointed electrodes 26a, 26b, and 26c extending through and supported by a Lucite bar 27. The pointed electrodes were mounted 1½ inches apart at about the vertical center line of the plate 25b with the central point at the center of the plate. The point of each of these electrodes faced the under surface of the conveyor belt and were spaced about one inch therefrom.

Figure 13:
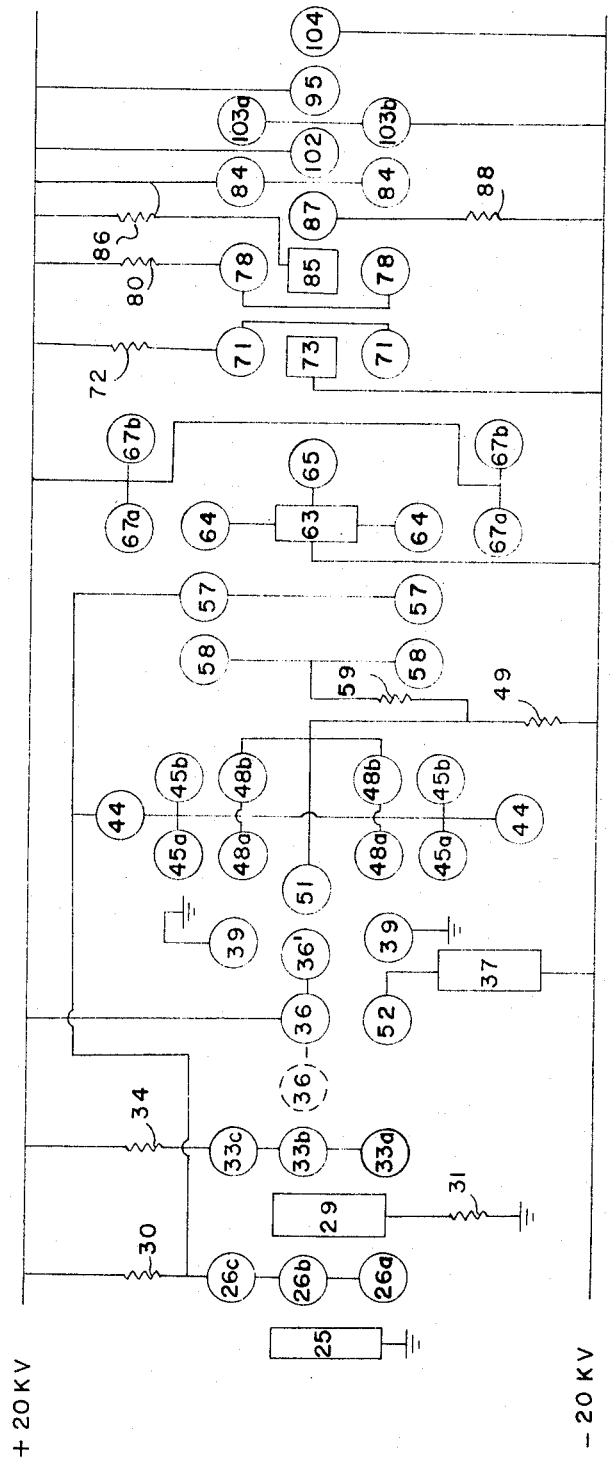
FIGURE 13 is a schematic diagram of the electrical circuiting in the machine of FIGURES 1 through 6.

A seen in FIGURE 13, the plate 25 was electrically connected to ground. The pointed electrodes were joined together and connected via a 100 megohm resistor 30 to the power output of a 20 kv. positive D.C. power supply. Under the stated conditions, the measured potential at the pointed electrodes was 7 kv. positive. Higher or lower voltages, as might be required for different spacings between the electrodes 25 and 26 or different ambient atmospheres, could be used.

A light charge is applied to the conveyor belt as it passes between the electrodes 25, and 26. This cancels out any stray charges that might be carried through from the previous run and also assists in forming the initial film fold in the packaging operation. The use of these conveyor belt bias electrodes is not essential but does give improved results when operating under high humidity conditions.

The upper run of the conveyor belt was supported on an elongated sheet 28 of Lucite (e.g. FIGURES 2 and 3). Just beyond the entrance end of the conveyor a sheet of aluminum foil 29 was secured to the top of the Lucite support sheet. In the machine illustrated the foil sheet was 12 inches wide and 10 inches long. Other sizes could be used for different size sheets of wrapping material. The foil sheet was connected to ground via a 400 megohm resistor 31. A strip 35 of insulating material, in this case Lucite, was secured over and just prior to the forward edge of foil electrode 29 for purpose to be described below.

A Lucite bar 32 (FIGURE 1) was mounted over the forward end of foil electrode 29. The exact placement of this bar is not critical so long as sufficient space is available at the feed end of the conveyor to load the wrapping material and product to be wrapped. A row of pointed electrodes 33a, 33b and 33c was set into the bar with the points facing the conveyor belt and spaced about 1½ inches therefrom. This spacing is not critical except that it must be sufficient to permit passage of product on the conveyor as it travels under these electrodes. The three electrodes were spaced laterally so that the electrostatic field generated thereby would be primarily concentrated on the leading edge of the wrapping sheet. In the specific example chosen the electrodes were set at the center and 2½ inches on each side of center of the bar 32. The blunt end of the pointed electrodes were electrically joined together and then connected via a 400 megohm resistor 34 between the electrodes 33a etc., and the next succeeding electrode assembly.

The support sheet 28 was cut away forwardly of the foil electrode 29 to provide an opening therein. A pointed electrode 36 (see FIGURE 2) was mounted at about the center of the opening and just below the conveyor belt. This electrode was fixed to a Lucite support bar 36a with the point facing upwards toward the undersurface of the belt, and was directly connected to the output terminal of the 20 kv. positive power supply. This single electrode could, if desired, be replaced by a cluster of similar pointed electrodes (as has been schematically shown in FIGURE 2 by dotted lines) to one of the electrodes 36. If a long object is to be enwrapped this electrode can be extended by adding one or more points in line with and forward of the one described (e.g., electrode 36′, FIGURE 2).

A large plate electrode 37 (note especially FIGURE 4) was mounted above the conveyor belt and centered over the pointed electrode 36. The specific dimensions of the plate electrode are not critical. It has been observed that larger surfaces tend to exert more powerful forces. In the specific machine illustrated the plate was a sheet of 20 gauge galvanized iron about 5 inches long and stretching across the full width of the machine (about 21 inches). All sharp corners and edges were removed by rounding the corners and soldering ¼ inch copper tubing 18 around the periphery. The plate was connected via a high voltage lead to the output terminal of the 20 kv. negative D.C. supply.

The electrodes 29, 33a, 33b, 33c, 36 and 37 are used to at least initiate folding of the first corner of wrapping material over the product. To make a "diaper" wrap the sheet of organic thermoplastic film wrapping material is placed diagonally on the conveyor belt over the foil electrode 29 and the product was placed at the center of this sheet (see FIGURE 7). The power supplies were switched on and adjusted until a potential of about 7 kv. existed between electrode 29 and electrodes 33a, 33b, 33c. This voltage is not critical and can be raised or lowered to accommodate thicker or thinner products which will in turn require or permit greater or smaller spacing, respectively, between this electrode pair. The greater the spacing the higher the required potential difference.

As the film and product pass between these electrodes an electrostatic charge is applied to the upper surface of the film. As previously noted this charge is primarily concentrated in a central band by reason of the placement of the point electrodes 33. As the package travels beyond the foil electrode 29 it is repelled upward by the electrostatic forces emanating from pointed electrode or electrodes 36, 36′ which are connected to a supply source having the same polarity as electrodes 33. At the same time the leading corner of the film sheet is also attracted upward by the plate electrode 37 which generates an electrostatic force field of opposite polarity. The insulating strip 35 prevents the film from folding back towards foil electrode 29 until side tucks can be made. At this point in the operation, the leading film corner is vertically stretched against the forward side wall of the product (note FIGURE 4).

On each side of the cutaway in support plate 28 in which electrodes 36, 36′ are mounted there is secured an aluminum foil electrode 39 (FIGURE 2). These are positioned so that the side flaps of the organic thermoplastic film will pass over them. Each of the electrodes 39 is electrically connected to ground. Their function is described hereinbelow.

Another pair of electrode assemblies is suspended from a supporting Lucite rail 40. Each assembly was carried by a supporting rod 41 which was pivotally connected to the rail 40 as to be freely swingable transversely of the conveyor belt in order to accommodate packages of different widths. In the embodiment illustrated (see especially FIGURE 5) the rods 41 were ⅜ inch copper tubing which extended to about ¾ inch above the top of the conveyor belt. At the bottom of each of these tubes there was secured a 3½ inch square Lucite plate 42 extending primarily toward the center of the conveyor belt. A curved Lucite rod 43 was secured to the inside edge of each plate. The curved end of these rods extended to the rear (towards the entrance end) of the machine and partially beneath the plate electrode 37. The vertical distance between these rods and foil electrodes 39 was about ¾ inch.

A pointed electrode 44 was soldered to each rod 41 on the top of the square plate 42. These electrodes extended beyond the plate 42 towards the entrance end of the machine and were bent downward slightly towards the respective foil electrodes 39. A pair of pointed electrodes 45a, 45b were secured to the underside of each plate 42 and were also electrically connected to the support rods 41. The rods 41 and hence electrodes 44 and 45a, 45b were connected via the 100 megohm resistor 30 to the 20 kv. positive power supply.

Cutouts were made in the conveyor support plate 28 beneath the electrodes 45a, 45b and a second pair of pointed electrodes 48a, 48b (see FIGURE 2) were mounted therein directly beneath each of the former electrode pairs and underneath the conveyor belt. These latter electrode pairs were each connected via a 100 megohm resistor 49 to the 20 kv. negative power supply. The gap between electrodes 45a, 45b and 48a, 48b was about 1 inch. Other spacings could be used if the potential across the gap is correspondingly adjusted.

The opposing electrode pairs 45a, 45b and 48a, 48b serve to form a crease in the forward edge of the respective side flaps of the wrapping material. They are therefore set at an angle to the line of travel of the conveyor, diverging outwardly towards the delivery end of the machine. Each of these electrode pairs could if desired be replaced by a horizontally disposed fine gauge wire or knife edge set at the same or similar angle.

Figure 8:
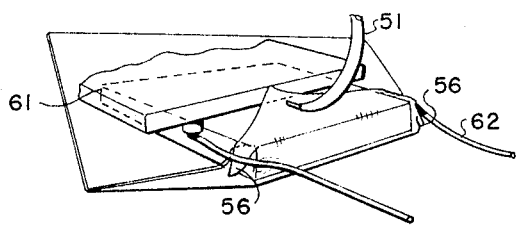
FIGURES 8 through 12 show, in sequence, the appearance of the package as it proceeds through the various wrapping steps.

At about the center of the rail 40 an electrode 51 is secured (see FIGURES 1 and 8). This electrode extends down towards the conveyor belt and is slightly bent towards the entrance end of the machine. Sufficient clearance is provided between the end of the electrode and the conveyor belt to permit passage of the product being wrapped. In addition there should be a sufficient gap between this electrode and the plate electrode 37 to preclude arc discharge between the two. In the specific embodiment here described the electrode 51 was a copper tube having a sharp point soldered to its lower end. To aid in precluding possible arc discharge to electrode 37 the tube was ensheathed with an insulating sleeve of plastic tubing. The tube was connected to the power supply via one of the negatively charged electrode pairs 48a, 48b.

In operation the sides of the leading flap of wrapping film stretched vertically between electrodes 36 and 37 contact the curved Lucite rods 43 and are swept inward toward the sides of the product forming a partial fold of the film upon itself. The electrostatic charge earlier applied to the film sheet (by electrodes 33a, 33b, 33c) causes it to be attracted to the foil electrodes 39, thus holding the bottom layer of the folded film firmly in place on the conveyor belt. The folded film layers at first tend to repel each other since they are of like charge. However, the package is conveyed into the influence of the electrodes 44 the electrostatic force field forces the overlying film layers together and towards the foil electrodes 39. The electrostatic force fields created by electrode pairs 45a, 45b and 48a, 48b completes the creasing action by tightly squeezing together the two overlying film layers. At the same time these latter electrode pairs apply a bias charge to the side flaps of the wrapping sheet which assists in the subsequent folding of these flaps up and over the product.

As the above steps are occurring the forward film flap is at the same time being repelled toward the product by the electrostatic forces emanating from the point of electrode 51. In addition the product itself becomes electrostatically charged as it passes over the pointed electrode 36 and the product acts like a charged plate which attracts the forward film flap. As the product passes between these two electrodes the leading flap is repelled and attracted into intimate contact with the product (see FIGURE 8).

Other folding mechanism could be used. Thus it is possible to space electrode 37 above the product so that the film flap is held in tension thereby and to then reverse the polarity of electrode 36. The tension will hold the flap until, as the product moves beneath the plate electrode, it pulls the film back over itself, (the product) and then, because it has been charged oppositely by electrode 36, will attract the flap down into contact with its upper surface. The previously described arrangement is, however, preferred.

At this point in the operation the trailing flap of wrapping film is approaching the influence of electrodes 36 and 37. Since this flap has also been previously charged by electrodes 29 and 33a, 33b, 33c it would be lifted into vertical position similarly as the leading flap. Although wrapping methods using this folding sequence could be used, it is preferred to fold the trailing flap last. Therefore, to prevent premature lifting of the trailing flap, the illustrated machine has a curved pointed electrode 52 (best seen in FIGURE 4) pivotally mounted on top and at about the center of plate electrode 37. The pivotal electrode is normally biased into raised position by any suitable means such as tension spring 53. A lever rod 54 is secured to the curved electrode at the pivot point and extends downwardly to just above the conveyor belt. As the product travels through the device it hits the rod and thus pivots the curved electrode down through a hole 55 cut in the front edge of the plate electrode. The curved electrode is electrically connected to the plate. As it pivots through the hole in the plate it causes the plate to become, in effect, a pointed electrode. Since the pointed electrode 36 induces an equal and opposite charge on the trailing film flap at the same time, this flap remains in effect, electrostatically neutral and remains in position on the conveyor belt.

Figure 11:
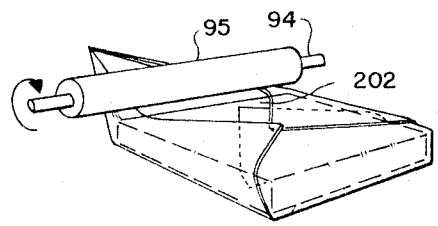

At this stage in the operation the package appears as illustrated in FIGURE 11. The combination of forcing the film against the forward sides of the product and folding the forward flap down over the top of the product produces an ear 56 of film at each of the upper forward side edges of the product. In the present machine these are folded down against the side of the product in the following manner.

To the top side of each Lucite plate 42 there is secured a metal foil plate 57 (FIGURE 1), the area of which is slightly smaller than the plate. The foil electrodes are connected to copper support rods 41 and thence to the power supply via the resistor 30. The foil plate could be replaced by a fine wire electrode or knife edge parallel with the inner edge of the plate 42 and spaced slightly therefrom. A small Lucite platform 61 is secured to each rod 41 above the plate 42. A pointed electrode 58 is mounted in each of these platforms. The electrodes 58 point downwards in a direction such that the respective ears 56 will pass directly thereunder. The electrodes 58 were connected via a 500 megohm resistor 59 to the lead from the electrode 51. The spacing between electrodes 58 and 57 was 1 inch, resulting in a potential difference of 5 kv. across the gap. Other potential differences could be used for different spacings. Supported on each platform 61 is a steel rod 62 (best seen in FIGURE 8 or other like means which extends down to a height slightly below the top of the product and also for a distance on a horizontal level toward the delivery end of the machine.

The ears 56 pass through the gap between electrodes 57 and 58, forcing together upper and lower film layers in the ears and creasing the fold therebetween. The steel rods 62 then plough the creased ears down and against the sides of the product. The extended length of the rods towards the discharge end of the machine holds the ears in place until they are locked permanently in place when the side flaps are folded up and over the product.

Another plate electrode 63 (FIGURE 1) constructed in substantially the same way as plate electrode 37 was mounted about 5 inches above the conveyor belt and just beyond the swinging electrode assemblies carrying electrodes 44, 45a, 45b, etc. as above described. The distance of plate 63 above the conveyor belt should be sufficient to prevent contact between the plate and film side flaps. A ring electrode 64 is soldered to the bottom of the plate adjacent each of the forward corners. In the specific embodiment illustrated these comprised ¼ inch copper tubing bent into a 2⅝ inch diameter circle. These dimensions can be varied to meet particular needs. It is only necessary that the rings be sufficiently large to exert the desired attracting force on the film side flaps, and not so large as to distort the electrostatic fields of other electrodes in same vicinity or to enable arc discharge to these other electrodes. The rings are set at an angle of about 45° to the line of travel of the conveyor belt diverging outwardly towards the forward end of the machine.

A slightly curved elongated tubular electrode 65 is secured to the underside of the plate at about the center of the forward end. This electrode extends beyond the rear edge of the plate substantially to the rear end of the next succeeding electrode assembly. A somewhat larger (in this case ¾ inch) ball bearing 66 is soldered onto the rear end of this electrode.

The plate 63 and thus also the auxiliary electrodes 64, 65 secured thereto were directly connected to the 20 kv. negative power supply.

Beneath the conveyor belt cutouts are made on each side of the support plate 28 beneath the rings 64. In each of these cutouts there is mounted a pair of pointed electrodes 67a and 67b (see FIG. 2). Electrodes 67a are positioned to act upon the respective triangular side flaps of the wrapping material near the apex of the triangle and electrodes 67b are located to act upon these flaps at a point nearer the product. Exact location of these electrode pairs is not critical. Each electrode pair is directly connected to the 20 kv. positive power supply.

Just beyond the plate 63 is a Lucite plate 68. U-shaped Lucite rails 69, 70 are adjustably suspended from the plate on each side of the elongated electrode 65. The base of each rail is about 4 inches long extending from about the position of ball bearing 66 (on the end of electrode 65) toward the forward edge of plate 63 and at the same time diverging towards the outer edge of the plate 63 (i.e., converging toward each other toward the forward edge of plate 68). The rails are staggered slightly, i.e., one is placed slightly closer to the center of the conveyor and at least slightly (e.g., 1 inch) to the rear of the other. The legs of the rails are adjusted so that rails are horizontally positioned at a height about 1/8 inch above the top of the product passing therebelow. A fine wire electrode 71 is strung parallel with and slightly spaced from (e.g., about 1/2 inch) the base and the forward vertical leg of each U-shaped rail. The wire electrode 71 is connected via a 50 megohm resistor 72 to the 20 kv. positive power supply.

Just beneath the conveyor belt and parallel with the tubular electrode 65 there is mounted another tubular electrode 73 (see FIGURE 2). In this machine, electrode 73 was a 3/8 inch copper, 5 inches long and having a 1/2 inch ball bearing 75a and 75b soldered to each end. The tube was mounted so that one of the ball bearings was directly below the forward edge of plate electrode 63. A cutout is made in the belt support plate 28 to permit application of the electrostatic force field from electrode 73 upon the product passing thereover. Lucite shield plates 74a and 74b were mounted on each side of electrode 73 and parallel therewith to prevent interference with the electrode pairs 67a, 67b. Electrode 73 was connected directly to the 20 kv. negative power supply.

As the package passes through the above described electrode assemblies, the electrode pairs 67a, 67b repel the side flaps upwards toward the rings 64, and also towards the plate 63. The rings, being closer to the conveyor, exert stronger lifting forces upon the film in the side flaps. However, because of the position and angular disposition of the rings, the side flaps do not actually contact them but are only partially lifted thereby, after which the electrostatic forces emanating from plate 63 take over and complete the lifting to vertical position. The tubular electrode 65 also exerts some action tending to pull the side flaps inward over the package.

The vertically lifted side flaps now pass through the converging U-shaped rails 69, 70 which apply a slight inward ploughing action on the film. At the same time the film is being repelled inward over the product by the electrostatic force fields of the respective fine wire electrodes 71, and being attracted inward by the electrostatic force field of electrode 65 and the electrostatic force induced on the product itself by tubular electrode 73 beneath the conveyor. Since one of the U-shaped rails is closer to the center of the conveyor and at least slightly behind the other rail, the side flap upon which it acts is forced down over the product first, almost immediately after which the second side flap is forced down. This precludes collision between the tips of the respective side flaps. The ears 56 have been held down by wires 62 until they are pinned against the product under the folded over side flaps.

The polarity of the various electrodes builds up charges of opposite sign on each layer of film as it is forced down over the previous layers. The layers are therefore attracted to each other and the wrapping film becomes temporarily sealed around the product.

Figure 9:
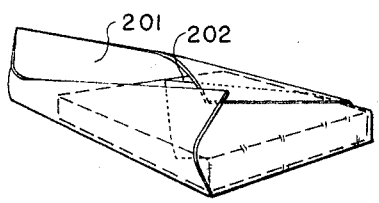

FIGURE 9 illustrates the appearance of the product as it leaves the wrapping stations described immediately above. Further operations and means for accomplishing them are described below.

Beyond the Lucite plate 68 there is a Lucite support rail 75 about the same distance above the conveyor as the rail 40. Two metal rods 76 are pivotally suspended from this rail one on each side of center similarly as the rods 41 on rail 40, i.e., so as to be swingable toward and away from the center line of the conveyor. A generally right triangular plate 78 (best seen in FIGURE 6) was secured to the bottom of each of the rods 76. The hypotenuse of each triangle faced the center of the conveyor and converged towards the delivery end of the machine. This plate may be composed of any suitable conducting material, e.g., a metal such as galvanized iron. Tubing, e.g., 1/4 inch copper tubing 79, was soldered around the edges of these plates and a suitable coating of high voltage insulation, e.g., 1/16 inch of polyvinylchloride was applied thereto. The length of rods 76 was adjusted so that the respective plates 78 were about 1/2 inch above the conveyor belt. The plates were connected via their respective rods and a 200 megohm resistor 80 to the 20 kv. positive power supply.

A small Lucite plate 82 was secured on each of the rods 76 above the plates 78. To each of these plates there is attached a small tubular electrode (e.g., 1/8 inch copper tubing) 83 with a short length of fine wire 84 soldered to its tip. The fine wire serves to cause the tube to act as a pointed electrode. Air or other suitable gas under light pressure (e.g., 0.5 pound per square inch gauge) is blown through the tubes 83 and by the fine wire. The tubes and wire are mounted so that the ionized moving air stream produced thereby passes beyond the base (i.e., the forward edge) of the triangular plates 78 and impinges on the film ears 90 formed at the rear upper corners of the product (see FIGURE 10) after it passes through the space between these plates. The wires 84 are connected via their respective copper tubes 83 directly to the 20 kv. positive power supply.

Directly beneath the plates 78 and on the upper surface of the conveyor support plate 28, there is secured a foil electrode 85 (FIGURE 2) which extends across the width of the support plate 28 at least slightly beyond the outer edges of the electrode plates 78. This foil electrode is connected via a 500 megohm resistor 86 to the 20 kv. positive power supply.

This support plate 28 is partially cutaway at its center and forward of the foil plate 85. In this cutaway a point electrode 87 (FIGURE 2) is mounted at about the center and below the conveyor belt and also slightly (about 1 inch or so) forward of plate electrodes 78. The electrode 87 is connected via a 100 megohm resistor 88 to the 20 kv. negative power supply.

As the partially wrapped package travels between the electrodes 78 it contacts the converging edges of these electrodes and gradually forces the electrode assemblies towards the sides of the conveyor. These electrodes are normally urged towards the center of the conveyor by suitable means such as light tension springs 89 (FIGURE 1). Consequently the plates move inward behind the product after it passes by, and form the rear corner tucks (see FIGURE 10) in the wrapping film. The fall angle of the plates is adjusted to provide a proper edge overlap in the trailing film flap, i.e., one which does not extend to or beyond the apex of the flap.

Figure 10:
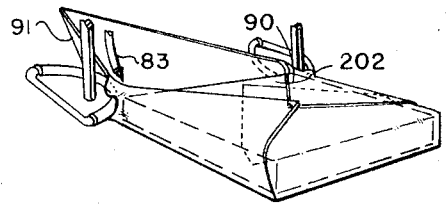

As this action is occurring the trailing film flap is held in position on the conveyor belt by the action of foil plate electrode 85. The package now appears approximately as illustrated in FIGURE 10. The ears 90 formed film at each corner of the product are repelled down and against the rear side wall of the product by the combined effects of the wire tip electrodes 84 and the pressure of the gas flowing through the tubes to which these electrodes are secured. In the meantime the product has also moved over the point electrode 87 which has induced a charge in the product of opposite polarity to that in the electrodes 84, thereby causing the ears to be attracted towards and "pinned" to the product.

The point electrode 87 also repels the trailing film flap upwards the electrodes 78 as this flap travels over it. This causes the layers of film in the overlapped regions 91 of the trailing film flap to adhere to each other electrostatically forming a good crease at the side folds. As these folded side areas pass out of the influence of the electrodes 78, the point electrode 87 begins to repel the apex portion of the trailing flap upwards. The remaining electrodes complete the final fold. These means, and their operation will now be described.

Inclined metal or otherwise conducting rails 92 (FIGURE 1) were secured to opposite sides of the frame above the conveyor belt. These served as a track for the pulley 93 rigidly secured at each end of an electrically conducting shaft 94 which extends between the rails. A cylindrical metal tube 95 about 6 inches long and 3 inches in diameter was mounted at about the center of the shaft. The tube was freely rotatable about the shaft. The incline of the rails 92 permits gravity return of the cylinder to its rest position, which is set by use of a stop bar 96 on each of the rails. The cylinder rest position is far enough above the conveyor belt to allow free movement of product beneath the cylinder. Electrical connection was made to the cylinder via the shaft and rails to the 20 kv. positive power supply.

About 10 inches above and slightly (e.g., about 4 inches) forward of the cylinder there was mounted a driven shaft 97 (FIGURE 1). A trip switch 98 actuated by product passing by on the conveyor activates a motor 99 which drives this shaft through the electric clutch assembly 100. Other equivalent drive means could obviously be used.

Two metal rods 101 were attached to the shaft 97 so that when this shaft was rotated the rods would in turn contact the shaft 94, thus rotating the latter shaft and cylinder 95 forward over product passing thereunder. After a 360° revolution (i.e., one full turn) a feeler switch on the shaft 97 opens the drive motor circuit and the shaft remains stationary until the drive system is again actuated by another product passing through the system. At about the center of shaft 97 there was secured an elongated slightly curved point-tipped electrode 102 (see also FIGURE 12). This electrode was connected to the 20 kv. positive power supply.

The necessity for synchronizing the movement of the two electrodes 95 and 102 and for reciprocating movement of the former can be removed by use of alternate arrangements. For example, a plurality of rotating cylindrical electrodes 95 could be secured between a parallel pair of continuously driven endless chains, the linear speed of which is greater than the linear speed of the conveyor belt. Above this could be mounted a corresponding plurality of continuously driven pointed electrodes suitably spaced from and moving together with the plural cylinders. Other suitable arrangements will also be apparent.

A transverse cutout was made in the conveyor support 28 slightly (e.g., about 1 inch) to the rear of and below the rest position of cylinder 95. In this cutaway there is mounted a transverse pair of pointed electrodes 103a, 103b (FIGURE 2) each spaced transversely about 1 inch or so from the center line of the conveyor belt and vertically spaced about ½ inch below the belt. The electrodes 103a, 103b were directly connected to the 20 kv. negative power supply.

In another centrally located cutaway about 10 inches or so forward of the electrodes 103a, 103b a single pointed electrode 104 was mounted about ⅛ inch below the conveyor belt and at about the center of the belt. This electrode was also directly connected to the 20 kv. negative power supply.

In operation the trailing film flap slides off the under surface of plate electrodes 78 where it has been pinned by the repelling action of pointed electrode 87. The pointed electrodes 103a, 103b continue the repelling action of electrode 87 and push the flap upwards toward the oppositely charged cylindrical electrode 95. The flap becomes electrostatically pinned to the surface of the cylinder (FIGURE 11).

At about the same time the leading edge of the product contacts and pushes trip switch 98 actuating the drive system which rotates shaft 97. The elongated rods 101 contact shaft 94 and rotate this shaft and the cylinder 95 forwardly up the incline of rails 92. The speed of this forward motion is somewhat faster than the speed of the product whereby the trailing film flap is partially drawn over the rear edge of the product under sufficient tension to lock the ears 90 under the flap and to produce a tight fitting near flap fold.

As the shaft 94 continues forward the tension forces overcome the small frictional forces between the shaft 94 and free rotating cylinder 95. This results in counter-rotation of the cylinder with respect to the shaft and a consequent unwinding of the rear film flap off the cylinder.

By this time the package has begun to pass over the pointed electrode 104 which charges the product causing it to attract the unwinding rear film flap down over the product. At about the same time the pointed electrode 102 moves in behind the unwinding flap and exerts an electrostatic repelling action forcing the flap down over the product. The co-action of electrodes 104 and 102 continues until the final fold is completed in much the same way as the initial fold is completed by the co-action of electrodes 51 and 36.

Figure 12:
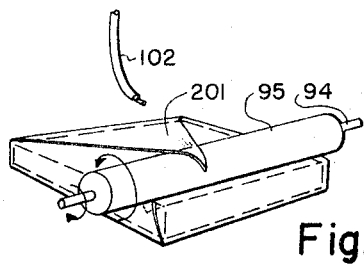

FIGURE 12 illustrates the approximate appearance of the package just as unwinding of the trailing flap from cylinder 95 is completed.

As previously noted, use of this invention produces charges of opposite sign to be built up in each layer of wrapping film before it is folded down over the layer beneath it. As a result the product becomes tightly wrapped, and the wrapping film is virtually free of any undesirable wrinkles or creases. The forces acting between oppositely charged film layers cause them to be quite firmly held together, forming in effect a moderately strong temporary seal. Temporary sealing or "pinning" together of any number of film layers can be accomplished.

The invention is applicable to a wide variety of organic thermoplastic wrapping films including films made from polyethylene, polypropylene, polyethylene terephthalate, polyvinyl chloride, poly (vinyl chloride-vinyl acetate) copolymers, polystyrene, vinylidene chloride copolymers of the Saran family, polyamides, and numerous other like polymers. It is especially applicable to automatic wrapping of thin, limp, organic thermoplastic films made from the above materials. The film thickness may vary over a wide range, e.g., from .0005 inch or less to .005 inch or more, depending primarily upon the stiffness of the film.

The foregoing description of one specific wrapping method and means for accomplishing the same has, by necessity, been quite detailed. It will be readily obvious that many variations and/or modifications are possible without departing from the spirit or scope of the invention. Thus the principles and advantages of the invention can be utilized for forming a wide variety of wraps other than a diaper wrap. Similarly, other electrode arrangements, spacings, voltages, etc., can be used in performing the method of the invention. It is therefore intended that the invention is to be limited only by the scope of the following claims.

What is claimed is:
1. Method of folding a sheet of limp, organic thermoplastic film over an object comprising:
  (a) placing the object on the film sheet,
  (b) applying an electrostatic charge to an uncovered portion of the sheet,
  (c) subjecting the opposite outside surface of the film sheet to an electrostatic force field of like polarity,
  (d) simultaneously subjecting the charged surface portion to an electrostatic force field of opposite polarity, and
  (e) adjusting the strength of the said fields to a value at least sufficient to lift the charged film portion up and then force it down over the product.

2. Method of folding a sheet of limp, organic thermoplastic film over an object resting thereon comprising:
  (a) applying an electrostatic charge of a first polarity to an uncovered portion of the sheet, (b) subjecting the opposite outside surface of the film sheet to an electrostatic force field of like polarity, (c) simultaneously subjecting the charged surface portion to an electrostatic force field of opposite polarity, (d) adjusting the strength of said fields (b) and (c) to a value at least sufficient to lift the charged film portion vertically against the forward edge of the object, (e) subjecting the outside surface of the vertically lifted film to an electrostatic force field of said opposite polarity and of sufficient strength to reverse the polarity of the charge on the film, (f) applying to the object an electrostatic charge of said first polarity, (g) adjusting the strength of said fields (e) and (f) to a value at least sufficient to force the lifted film down into intimate contact with the object.

3. Method of wrapping an object in an oversize sheet of limp, organic thermoplastic film upon which said object is resting comprising:

(a) subjecting the opposite outside surface of the film sheet to an electrostatic force field of a given polarity, (b) simultaneously subjecting the charged surface portion to an electrostatic force field of opposite polarity, (c) adjusting the strength of said fields (a) and (b) to a value at least sufficient to lift the charged film portion vertically against the forward edge of the object, (d) subjecting the outside surface of the vertically lifted film to an electrostatic force field of said opposite polarity and of sufficient strength to reverse the polarity of the charge on the film, (e) sequentially repeating said steps (b) through (e) upon other uncovered film portions until all have been lifted and forced down over the object.

4. Method of wrapping an object in an oversize sheet of limp, organic thermoplastic film upon which said object is resting comprising:

(a) applying an electrostatic charge of a first polarity to an uncovered portion of the sheet, (b) subjecting the opposite outside surface of the film sheet to an electrostatic force field of like polarity, (c) simultaneously subjecting the charged surface portion to an electrostatic force field of opposite polarity, (d) adjusting the strength of said fields (b) and (c) to a value at least sufficient to lift the charged film portion vertically against the forward edge of the object, (e) subjecting the outside surface of the vertically lifted film to an electrostatic force field of said opposite polarity and of sufficient strength to reverse the polarity of the charge on the film, (f) applying to the object an electrostatic charge of said first polarity, (g) adjusting the strength of said fields (e) and (f) to a value at least sufficient to force the lifted film down into intimate contact with the object, (h) sequentially repeating said steps (a) through (g) upon other uncovered film portions until all have been vertically lifted and then forced down over the object.

5. Apparatus for folding a sheet of limp, organic thermoplastic film over an object resting thereon comprising:

(a) a first electrode to apply an electrostatic charge to an uncovered portion of the film, (b) a second electrode beneath the opposite outside surface of the film, (c) a third electrode above the charge surface of the film, (d) high voltage direct current power means of one polarity connected to said first and second electrodes, (e) high voltage direct current power means of opposite polarity connected to said third electrode.

6. Apparatus as defined in claim 5 further comprising:

(f) means to convey the object and film over said second electrode, (g) a fourth electrode connected to said power means (e) and positioned forward of said third electrode and at least slightly above the height of said object.

7. Automatic diaper wrap packaging machine including a conveyor having a large ratio of open to closed surface area for carrying in a given line of travel, a sheet of wrapping material and product to be wrapped, and first flap folding means in said line of travel comprising:

(a) a first grounded plate electrode beneath the conveyor, (b) a plurality of point electrodes extending transversely of the conveyor and pointing towards said first plate electrode (a), (c) at least one pointed electrode beneath the conveyor and forward of the electrode (a), (d) a second plate electrode above the conveyor and positioned above the pointed electrode (c), (e) a third pointed electrode just forward of the plate electrode (d) and at a height above the conveyor slightly higher than the height of product being wrapped, (f) high voltage direct current power means of one polarity connected to said electrodes (b), (c) and (e), and (g) high voltage power means of opposite polarity connected to said electrode (d).

8. Apparatus as defined in claim 7 further comprising a grounded plate electrode on each side of said electrode (c).

9. Apparatus as defined in claim 8 further comprising a pointed rear flap hold down electrode pivotally mounted on and of the same polarity as said electrode (d).

10. Automatic diaper wrap packaging machine including a conveyor having a large ratio of open to closed surface area for carrying in a given line of travel, a sheet of wrapping material and product to be wrapped, and side flap folding means comprising:

(a) a first plate electrode above and extending transversely of the conveyor, (b) a pair of ring electrodes secured on the underside of the plate electrode (a), one adjacent each front corner, said rings being generally perpendicular to the plate and set at an angle of about 45° to the line of travel of the conveyor, (c) an elongated tubular, rounded end electrode secured on the underside of the plate at about the middle of the front edge and extending parallel to the line of travel of the conveyor for a distance beyond the rear edge of the plate (a), (d) a pair of pointed electrodes underneath each side of the conveyor and so positioned that one of each pair is at about the tip of a side flap passing thereover and the other is nearer the center of the conveyor but outside the side edge of the product, (e) a second tubular electrode rounded at both ends mounted beneath the conveyor and in line with the tubular electrode (c), one end of the second tubular electrode being directly beneath the rear edge of plate (a) and the other end generally beneath the rounded end of elongated electrode (c), (f) a pair of non-conducting U-shaped rails above the conveyor and forward of said plate electrode (a), said rails converging slightly towards the center of the conveyor but nevertheless spaced from vertical plane of elongated electrode (c), one rail being spaced slightly forward of the other, and (g) fine wire electrodes strung horizontally just above the rails and vertically just to the rear of the forward leg of the rails, (h) high voltage direct current power means of one polarity connected to said electrodes (a), (b), (c) and (e), (i) high voltage direct current power means of opposite polarity connected to said electrodes (d) and (g).

11. Device of claim 10 further comprising an insulating plate between the electrode (c) and each of the point electrode pairs (d).

12. Automatic diaper wrap packaging machine including a conveyor having a large ratio of open to closed surface area for carrying in a given line of travel, a sheet of wrapping material and product to be wrapped and rear flap folding means comprising:

(a) parallel rails to each side of and above the conveyor and inclined slightly toward the forward end of the conveyor, (b) a freely rotating cylinder electrode mounted centrally of a rotatable shaft which rides on rails (a), (c) a point electrode beneath the conveyor and to the rear of the cylindrical electrode, (d) a pair of pointed electrodes transversely of and beneath the conveyor and just slightly forward of the cylinder electrode rest position, (e) a driven shaft mounted above the cylinder-carrying shaft and forward of the cylinder and pointed electrodes (d), (f) a point electrode secured at about the center of shaft (e) for rotational movement therewith and a rod secured to the shaft on each side of the electrode to push the cylinder-carrying shaft, (g) a point electrode beneath the conveyor in line with pointed electrodes (c) and (f) and substantially beyond point electrodes (d), (h) high voltage direct current power means of one polarity connected to said electrodes (b) and (f), (i) high voltage direct current power means of opposite polarity connected to said electrodes (c), (d) and (g).

No references cited.

FRANK E. BAILEY, *Primary Examiner.*

L. S. BOUCHARD, *Assistant Examiner.*